(12) United States Patent
Ishikawa et al.

(10) Patent No.: US 6,636,229 B2
(45) Date of Patent: Oct. 21, 2003

(54) GRADATION CORRECTION CIRCUIT, AND γ CORRECTION APPARATUS

(75) Inventors: Katsuya Ishikawa, Takatsuki (JP); Atsuhisa Kageyama, Ibaraki (JP); Keiichi Ito, Moriguchi (JP)

(73) Assignee: Matsushita Electric Industrial Co., Ltd. (JP)

( * ) Notice: Subject to any disclaimer, the term of this patent is extended or adjusted under 35 U.S.C. 154(b) by 319 days.

(21) Appl. No.: 09/801,872

(22) Filed: Mar. 9, 2001

(65) Prior Publication Data

US 2001/0043183 A1 Nov. 22, 2001

(30) Foreign Application Priority Data

Mar. 10, 2000 (JP) .............................. 2000-066495

(51) Int. Cl.[7] ................................................ G09G 5/02
(52) U.S. Cl. .................. 345/590; 345/600; 345/593; 345/596; 345/597; 348/254; 358/519
(58) Field of Search ................................. 345/590, 593, 345/596, 597, 600; 348/254; 358/519

(56) References Cited

U.S. PATENT DOCUMENTS

| | | | | |
|---|---|---|---|---|
| 5,598,184 A | * | 1/1997 | Barkans ....................... 345/597 |
| 5,671,021 A | * | 9/1997 | Kumada et al. ............ 348/644 |
| 5,821,918 A | * | 10/1998 | Reinert et al. .............. 345/643 |
| 5,847,700 A | * | 12/1998 | Hannah ....................... 345/558 |
| 5,850,207 A | * | 12/1998 | Eglit ............................ 345/671 |
| 5,872,556 A | * | 2/1999 | Rackley et al. ............. 345/603 |
| 6,115,507 A | * | 9/2000 | Eglit et al. ................... 382/300 |
| 6,388,648 B1 | * | 5/2002 | Clifton et al. ................ 345/88 |
| 6,446,155 B1 | * | 9/2002 | Maggi et al. ................ 710/313 |

FOREIGN PATENT DOCUMENTS

| JP | 5-83596 | 4/1993 |
|---|---|---|
| JP | 11-120344 | 4/1999 |

* cited by examiner

Primary Examiner—Matthew C. Bella
Assistant Examiner—Manucher Rahmjoo
(74) Attorney, Agent, or Firm—Parkhurst & Wendel, L.L.P.

(57) ABSTRACT

A gradation correction circuit comprises: an arithmetic means (101~104, 106, 108~110) for operating an output value corresponding to each broken point of a broken line in a vertical blanking period; a level detection circuit 107 for identifying a size relation between each broken line point which is an input value corresponding to each broken point and an input video signal, and calculating a difference between the input video signal and each broken line point; and a correction means (101~102, 104, 107, 109~111) for selecting a gradient of the broken line on the basis of the result identified by the level detection circuit 107, and performing gradation correction of the input video signal on the basis of the selected gradient of the broken line, the output value calculated by the arithmetic means, and the difference calculated by the level detection circuit, wherein the arithmetic means and the correction means share a number of circuits (102, 109, 110). Therefore, there is provided a gradation correction circuit where video correction with high precision can be realized without using a memory storing a lookup table, or without increasing a circuit scale.

5 Claims, 6 Drawing Sheets

GRADATION CORRECTION CIRCUIT, AND γ CORRECTION APPARATUS

FIELD OF THE INVENTION

The present invention relates to a gradation correction circuit for correcting a gradation of a video signal, and a γ correction apparatus using the gradation correction circuit.

BACKGROUND OF THE INVENTION

In recent years, digital video display apparatuses such as an LCD and a PDP have been widely spread in addition to a conventional CRT. In these video display apparatuses, a gradation of a level of an output signal with relative to a level of an input level is not linear, and the video display apparatus have inherent input output characteristics, respectively. Therefore, in order to obtain optimum images in accordance with the inherent display characteristics of these display apparatus, a reverse correction corresponding to display characteristics of each display apparatus is performed by a gradation correction circuit, and an output signal of the gradation correction circuit is inputted to the display apparatus. By using such gradation correction circuit, the input output characteristics between the input to the gradation correction circuit and the output from the display apparatus become linear.

A conventional gradation correction circuit has such a construction that correction characteristics is stored in storage devices such as a RAM or a ROM, and correction data in accordance with the level of the input signal is read out from a memory to be outputted as corrected signal.

Another conventional gradation correction circuit has such a construction that the correction characteristics is subjected to a linear approximation employing a broken line, the broken line is operated by an arithmetic circuit constituted by multipliers and adders, and outputs of the arithmetic circuit corresponding to the input level are selected to provide a corrected signal.

FIG. 6(a) is a block diagram illustrating a structure of a conventional gradation correction circuit.

In FIG. 6(a), the conventional gradation correction circuit includes arithmetic circuits 700, 701 and 702 each comprising a multiplier and an adder, which arithmetic circuit outputs values of the respective sections of the broken line in accordance with the input signal X. A selection circuit 703 which selects one among the outputs of the arithmetic circuits 700, 701 and 702 is provided to output the corrected correction output signal Y.

The conventional gradation correction circuit thus constructed presents the input output characteristics as shown in FIG. 6(b).

However, in the gradation correction circuit which stores the correction characteristics in a memory such as a RAM or a ROM, it is necessary to memorize the values of the outputs corresponding to the inputs stored in a memory in a form of a lookup table, and all the points are required to be stored in a memory. Therefore, when it is attempted to increase the bit number in order to increase the gradation, a larger memory capacity is required.

In the conventional gradation correction circuit shown in FIG. 6, a multiplier and an adder are required for each straight line of the broken line. Therefore, when the number of the straight lines of the broken line is increased so as to perform detailed correction employing the broken line, i.e., correction with high precision, the number of multipliers increases and the circuit size is increased.

SUMMARY OF THE INVENTION

The present invention is made to solve the above problems, and has for its object to provide a gradation correction circuit and a γ correction apparatus which can perform gradation correction without using a memory storing a lookup table, and which can perform correction with high precision on the basis of an input output characteristic represented by a broken line without increasing a circuit scale.

According to a first aspect of the present invention, a gradation correction circuit which performs gradation correction of an input video signal on the basis of input output characteristics represented by a broken line comprises: arithmetic means for operating output values corresponding to respective broken points of the broken line representing input output characteristics of a display apparatus in a vertical blanking period of an input video signal; a level detection circuit for identifying a size relation between each broken line point which is an input value corresponding to each broken point, and an input video signal, and operating a difference between the input video signal and each broken line point in a video signal period; correction means for selecting a gradient of the broken line on the basis of an identification result from the level detection circuit, and for performing gradation correction of the input video signal on the basis of the gradient of a selected broken line, the output value being calculated by the arithmetic means, and the difference calculated by the level detection circuit.

Therefore, gradation correction with high precision can be realized without increasing a circuit scale, or without using a memory storing a lookup table.

According to a second aspect of the present invention, in the gradation correction circuit of the first aspect, the arithmetic means and the correction means share a number of circuits.

Therefore, gradation correction with high precision can be realized without increasing a circuit scale, or without using a memory storing a lookup table.

According to a third aspect of the present invention, a gradation correction circuit for a display apparatus which performs gradation correction of an input video signal on the basis of input output characteristics represented by a broken line comprises: a first selector for selecting one among plural gradients of a broken line representing input output characteristics of a display apparatus; a difference arithmetic unit for calculating the difference between the plural broken line points which are the input values corresponding to the broken points of the broken line; a second selector for selecting one among the difference values calculated by the difference arithmetic unit; a level detection circuit for receiving the broken line points and the input video signal as inputs, identifying between which broken line points the input video signal lies, and calculating a difference between the input video signal and the broken line point; a third selector for selecting one between the difference value calculated by the level detection circuit and the difference value selected by the second selector; a multiplier for multiplying the gradient of the broken line selected by the first selector and the difference value selected by the third selector; an integrator for successively adding the values, which are successively outputted from the multiplier; a register for holding the output of the integrator as the output value corresponding to each broken point; an adder for adding the output value from the register and the output from the multiplier; and a control circuit for controlling the first through third selectors and the register on the basis of the identification result from the level detection circuit and the vertical blanking pulse, wherein, when the start of the vertical blanking period is detected by the vertical blanking pulse, the control circuit outputs a selection signal at a predetermined timing, thereby successively instructing the first and second selectors to select the gradients of the broken line and the difference values, respectively, and instructing the third selector to select the difference value selected by the second selector, and, when the start of the video signal period is detected by the vertical blanking pulse, the control circuit instructs the third selector to select the difference value calculated by the level detection circuit, and instructs the first selector to select the gradient of the broken line corresponding to the identification result from the level detection circuit as well as instructs the register to output the value corresponding to the identification result, on the basis of the identification result.

Therefore, gradation correction with high precision can be realized without increasing a circuit scale, or without using a memory storing a lookup table.

According to a fourth aspect of the present invention, the gradation correction circuit further comprises: a video detection control circuit for setting the broken line points and the gradients of the broken line on the basis of the input video signal.

Therefore, correction characteristics can be changed in real time, and an improvement in an image quality or the like can be effectively performed.

According to a fifth aspect of the present invention, a γ correction apparatus comprises three gradation correction circuits, and a first gradation correction circuit performs gradation correction of an R signal, a second gradation correction circuit performs gradation correction of a G signal, a third gradation correction circuit performs gradation correction of a B signal, and correction characteristics of the first through third gradation correction circuits are set for each RGB signal.

Therefore, effective video correction of the input video signal can be performed.

DETAILED DESCRIPTION OF THE PREFERRED EMBODIMENTS

Embodiment 1

Hereinafter, a gradation correction circuit according to a first embodiment of the present invention will be described with reference to the drawings. The gradation correction circuit according to the first embodiment performs gradation correction on the basis of input output characteristics represented by the broken line.

Figure 1:
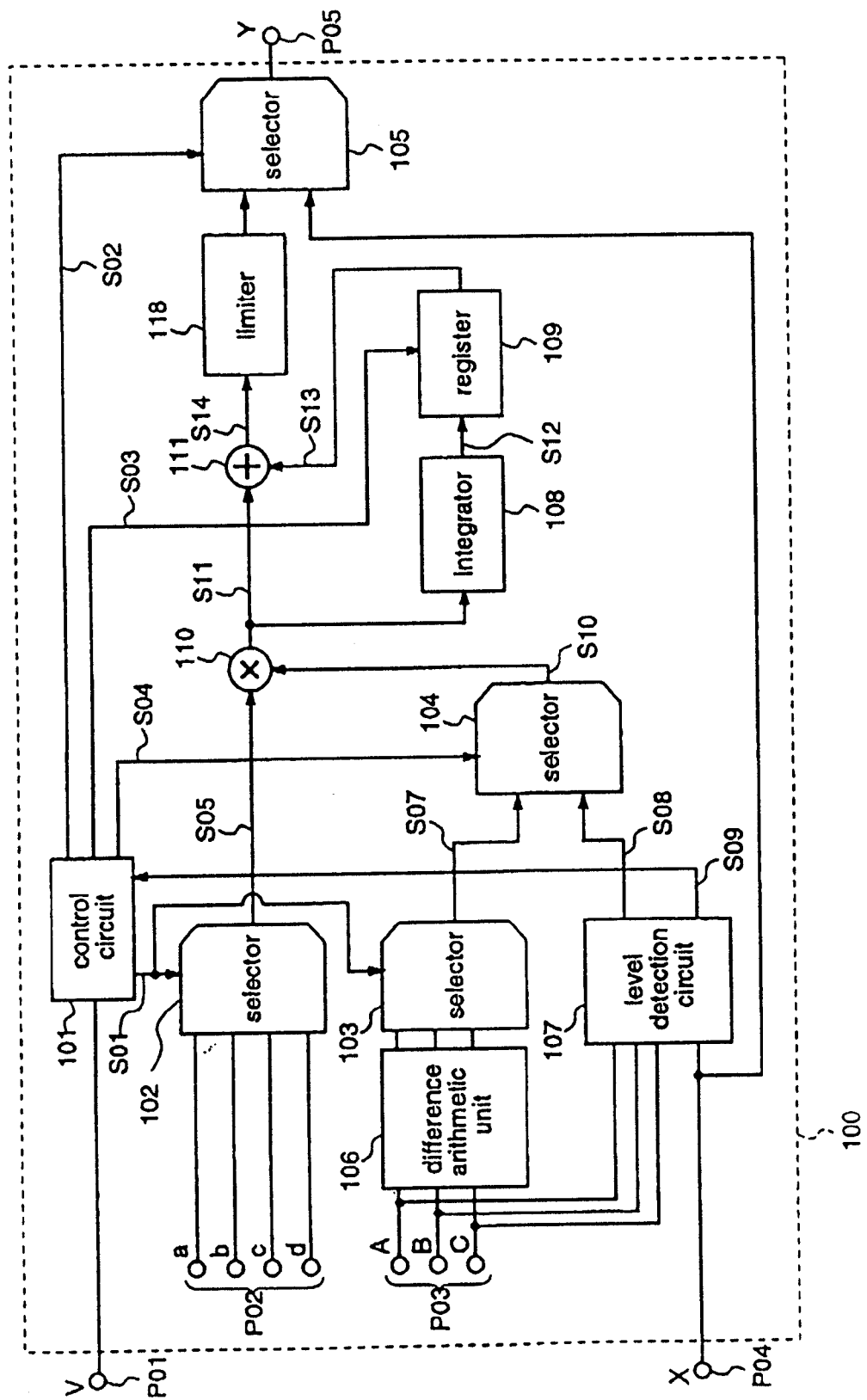
FIG. 1 is a block diagram illustrating a structure of a gradation correction circuit according to a first embodiment of the present invention.
Figure 2:
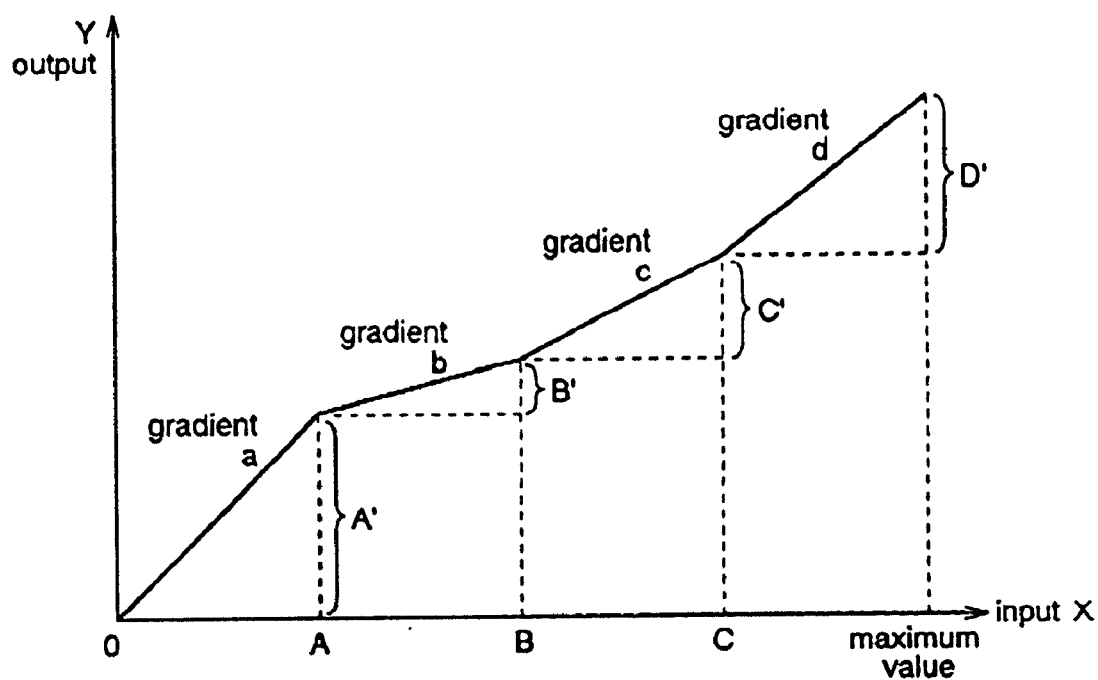
FIG. 2 is a diagram showing input output characteristics of the gradation correction circuit according to the first embodiment.
Figure 3:
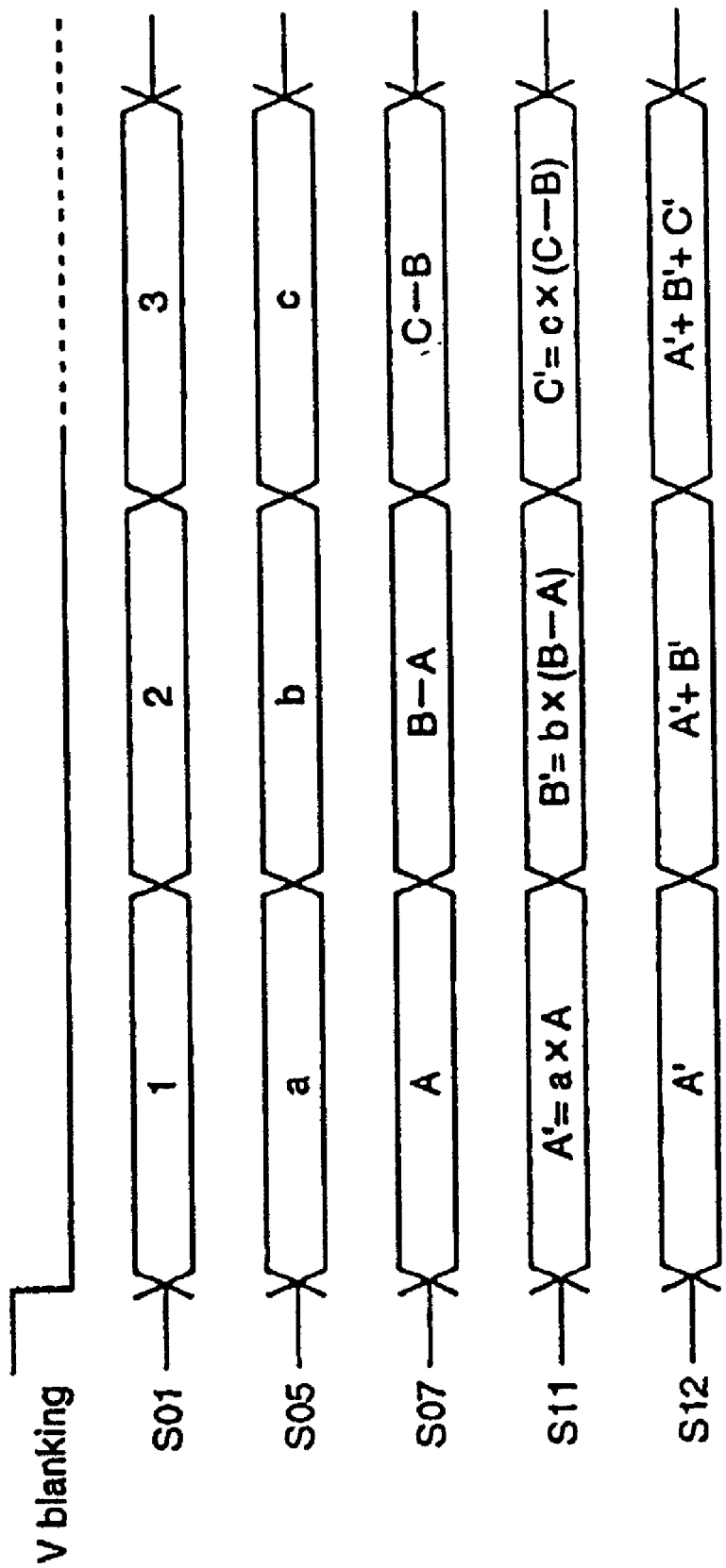
FIG. 3 is a timing chart for explaining the operation of the gradation correction circuit according to the first embodiment.

FIG. 1 is a block diagram illustrating a structure of the gradation correction circuit according to the first embodiment. FIG. 2 is a diagram showing input output characteristics of the gradation correction circuit according to the first embodiment. FIG. 3 is a timing chart for explaining an operation of the gradation correction circuit according to the first embodiment.

In FIG. 1, a gradation correction circuit 100 according to the first embodiment includes a control circuit 101, selectors 102~105, a difference arithmetic unit 106, a level detection circuit 107, an integrator 108, a register 109, a multiplier 110, an adder 111, and a limiter 118.

The control circuit 101 controls the selectors 102 to 105 and the register 109 by selection signals S01, S02, S04, and a signal S03, on the basis of a V(vertical) blanking pulse inputted by a V blanking pulse input terminal P01 and an identification signal S09 from the level detection circuit 107.

The selector 102 selects one among gradients a, b, c, and d of the broken line which are set in the broken line gradient data input terminal P02 on the basis of the selection signal S01 outputted from the control circuit 101, and outputs the selected gradient of the broken line as a gradient signal S05 to the multiplier 110.

The selector 103 selects one among difference values calculated by the difference arithmetic unit 106 on the basis of the selection signal S01 outputted by the control circuit 101, and outputs the selected difference value as a signal S07 to the selector 104.

The selector 104 selects one between the signal 507 and a difference signal S08 on the basis of the selection signal S04 outputted from the control circuit 101, and outputs the selected signal as a signal S10 to the multiplier 110.

The selector 105 selects one between an input signal X and a signal from the limiter 118 on the basis of the selection signal S02 outputted from the control circuit 101, and outputs the selected signal as a correction output signal Y to a video signal output terminal P05.

The difference arithmetic unit 106 performs difference operations for the broken line points A, B and C which are inputted to the broken line point input terminal P03, and calculates the difference values between the respective broken line points, i.e., those for sections A–0, B–A, and C–B, to output the same to the selector 103. Here, the broken line points are input values corresponding to the varying points of the gradients of the broken line shown in FIG. 2 (broken points of the broken line).

Further, the respective gradients a, b, c, and d of the broken line which are set at the broken line gradient data input terminal P02, and the respective broken line points A, B and C which are set in the broken line point input terminal P03, are set in a setting register which is not shown. The values a, b, c, d, A, B, and C which are set in this setting register can be changed, for example, by IIC bus or the like.

The level detection circuit 107 compares the respective broken line points A, B and C with the input signal X inputted from the video signal input terminal P04, identifies between which broken line points the level of the input signal X lies, and outputs the identification result as an identification signal S09 to the control circuit 101. Further, the level detection circuit 107 calculates a difference between the broken line point which is smaller than the input signal X and closest to the input signal X and the input signal X, and outputs the difference value with the input signal X as a difference signal S08 to the selector 104. Here, the input signal X inputted by the video signal input terminal P04 is a digital video signal. As this digital video signal, there may be an R signal, a G signal, and a B signal.

The integrator 108 adds the values which are successively inputted thereto, and outputs the added result to the register 109.

The register 109 holds the value inputted from the integrator 108.

The multiplier 110 multiplies a gradient signal S05 which is selected by the selector 102, by the signal S10 which is selected by the selector 104.

The adder 111 adds a signal S13 from the register 109 and a signal S11 from the multiplier 110.

When a signal S14 from the adder 111 exceeds a predetermined upper limit, the limiter 118 suppresses the signal S14 to the upper limit to output the same.

Next, an operation of the gradation correction circuit according to the first embodiment will be described.

The gradation correction circuit 100 according to the first embodiment performs gradation correction by a broken line composed of four straight lines as shown in FIG. 2. The broken line includes three broken line points A, B and C, and the four gradients of the broken line are a, b, c, and d, respectively.

Initially, it is assumed that a V blanking period is initiated and a V blanking pulse is inputted from the V blanking pulse input terminal P01.

Then, the control circuit 101 detects the start of the V blanking period from the v blanking pulse, and instructs the selector 105 to select the input signal X on the basis of the selection signal S02. Further, the control circuit 101 instructs the selector 104 to select the signal S07 on the basis of the selection signal S04. Then, the control circuit 101 generates a selection signal S01 at a preferable timing.

As shown in FIG. 3, initially, when the selection signal S01 is "1", the selector 102 selects "a" as the gradient of the broken line, and the selector 103 selects "A" as the difference value. Then, "a" which is selected by the selector 102 and "A" which is selected by the selector 103 are multiplied by the multiplier 110, thereby outputting a signal S11 of A'=a×A. Since this value A' is a signal which is inputted to the integrator 108 for the first time, the output of the integrator 108 also becomes A'. Then, this A' is stored in the register 109.

When the selection signal S01 is "2", the selector 102 selects "b" as the gradient of the broken line and the selector 103 selects B−A as the difference value. Then, "b" which is selected by the selector 102 and "B−A" which is selected by the selector 103 are multiplied by the multiplier 110, thereby outputting a signal S11 of B'=b×(B−A). This value B' is added to A' in the integrator 108, whereby a signal of A'+B' is outputted from the integrator 108, which will be stored in the register 109.

When the selection signal S01 is "3", the selector 102 selects "c" as the gradient of the broken line, and the selector 103 selects C−B as the difference value. Then, "b" which is selected by the selector 102 and "C−B" which is selected by the selector 103 are multiplied by the multiplier 110, thereby outputting a signal S11 of C'=c×(C−B). This value C' is added to A'+B' in the integrator 108, whereby a signal of A'+B+C' is outputted from the integrator 108, which will be stored in the register 109.

The register 109 holds "A'", "A'+B'", and "A'+B'+C'" as the values of the outputs in the respective broken line points A, B and C as shown in FIG. 2, until a new value is stored in the register 109. In this way, an arithmetic means including the control circuit 101, the selectors 102 to 104, the difference arithmetic unit 106, the integrator 108, and the multiplier 110, calculates the output values corresponding to the respective broken points of the broken line of the input output characteristics shown in FIG. 2.

Further, the output values A', A'+B', and A'+B'+C' corresponding to these broken line points A, B and C may be obtained for each blanking period, or for plural blanking periods. However, the integrator 108 and the register 109 are reset at the starting time of the blanking period during when the output values are obtained.

Next, it is assumed that the input of the V blanking pulse from the V blanking pulse input terminal P01 is completed, i.e., the V blanking period is finished, and a video signal period starts.

Then, the control circuit 101 detects the start of the video signal period on the basis of the V blanking pulse, and instructs the selector 105 to select the signal from the limiter 118 on the basis of the selection signal S02. The control circuit 101 also instructs the selector 104 to select the difference signal S08 on the basis of the selection signal S04.

When the input signal X is inputted from the video signal input terminal P04 to the level detection circuit 107, the level detection circuit 107 compares the respective broken line points A, B and C and the input signal x, identifies a size relation between the input signal x and the respective broken line points, i.e., between which broken line points the level of the input signal X lies, and outputs the identification result as an identification signal S09 to the control circuit 101. Further, the level detection circuit 107 calculates a difference between the broken line point which is smaller than the input signal X and closest to the input signal X and the input signal X, and outputs the difference value as the difference signal S08 to the selector 104.

The control circuit 101 calls data stored in the register 109 by the signal S03 on the basis of the signal S09. Further, the control circuit 101 selects one among the gradients inputted by the selector 102 by the selection signal S01. Here, when the gradient "d" is selected, the control circuit 101 outputs "4" as the control signal S01 to the selection circuit 102.

For example, when it is detected that the level of the input signal X lies between the broken line points B and C on the basis of the signal S09, the control circuit 101 performs a control to read the value of "A'+B'" stored in the register 109. The control circuit 101 also controls the selector 102 so as to select the gradient "c". In this case, the difference signal S08 becomes the value of "X−B". Further, when the level of the input signal X lies between 0 and the broken line point A, the control circuit 101 performs a control so as to instruct the register 109 to output "0".

The multiplier 110 multiplies the difference signal S08 obtained in the video signal period by the gradient signal S05 corresponding to the input signal level. The multiplied result and the output value S13 at the broken line point which is called from the register 109 on the basis of the signal S03 are added by the adder 111. The added result signal S14 is outputted to the limiter 118. Then, the signal S14 is limited to the upper limit or less by the limiter 118, and is outputted from the video signal output terminal P05 and through the selector 105 as the correction output signal Y.

In this way, by operating a correction means including the control circuit 101, the selectors 102 and 104, the level detector 107, the register 109, the multiplier 110, and the adder 111, the correction output signal Y which is obtained by subjecting the broken line correction which is arbitrarily set as shown in FIG. 2 to the input signal X can be obtained. Here, an arithmetic means for calculating the output values corresponding to the respective broken points of the broken line and the correction means share a number of circuits such as the selector 102 and the multiplier 110, whereby an increase in the circuit size is reduced.

Further, in this first embodiment, a description is given of a case where the four gradients of the broken line are a, b, c and d, respectively, and three values, A, B and C, are used as the broken line points. However, the number of these gradients of the broken line and the number of the broken line points are determined by the shape of the broken line as shown in FIG. 2, and are not restricted to that which is described in this first embodiment.

Furthermore, the gradation correction circuit 100 according to this first embodiment includes a limiter 118. However, the gradation correction circuit 100 may not be provided with the limiter 118 and may set the gradient d as an arbitrary value d so as not to exceed the maximum value of the output Y.

As described above, the gradation correction circuit 100 according to the first embodiment operates the output values corresponding to the respective broken line points in the V blanking period and stores the same in the register 109. The control circuit 101 selects the gradient of the broken line and the output value stored in the register 109 according to the input value of the input signal X, and performs gradation correction of the input signal X. Therefore, even when the number of the broken line points increases, the increase in the arithmetic circuits such as the multiplier 110 and the adder 111 can be suppressed and gradation correction with high precision can be realized with neither increasing the circuit scale, nor employing a memory storing a lookup table.

Embodiment 2

Hereinafter, a gradation correction circuit according to a second embodiment of the present invention will be described with reference to the drawings.

Figure 4:
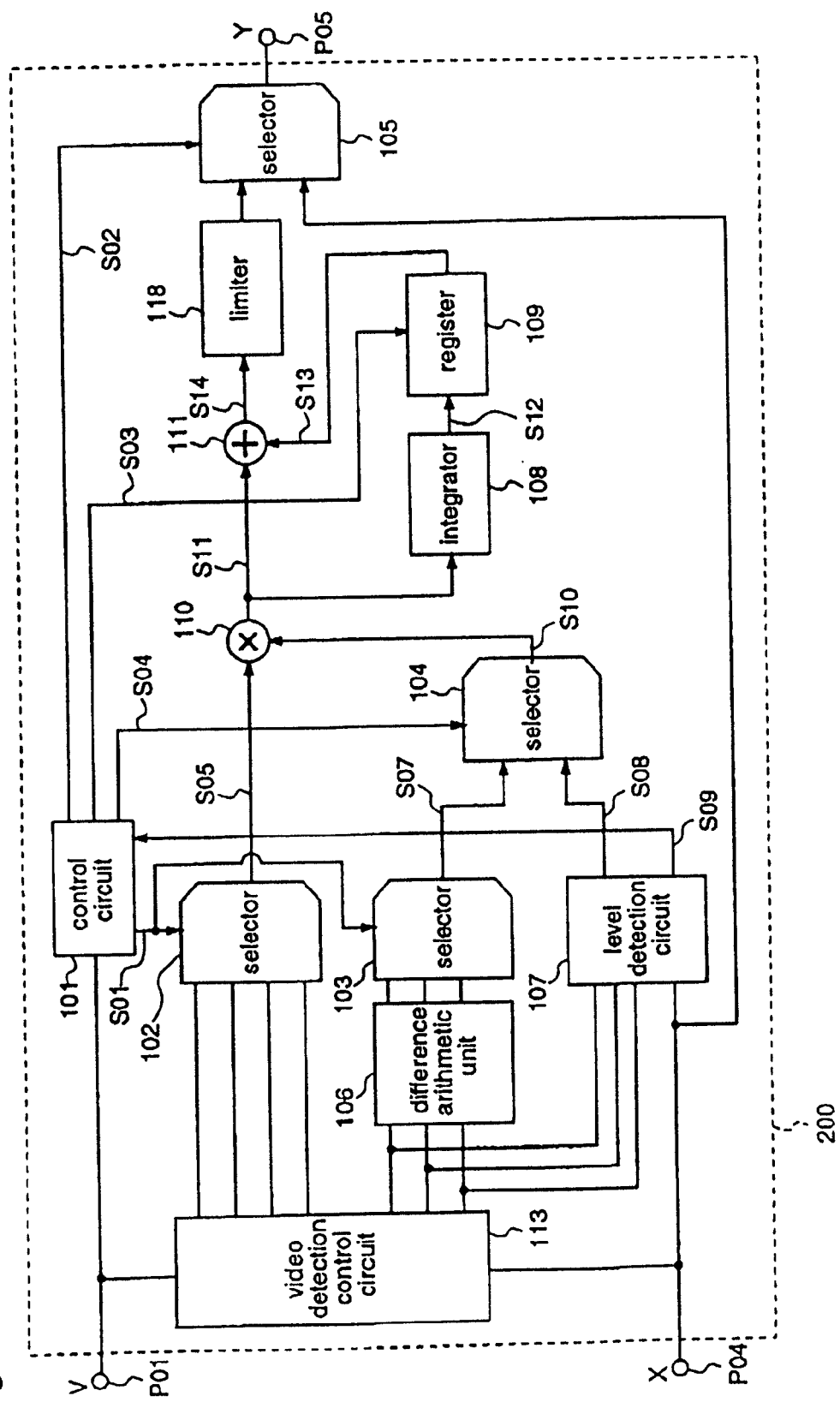
FIG. 4 is a block diagram illustrating a structure of the gradation correction circuit according to a second embodiment of the present invention.

FIG. 4 is a block diagram illustrating a structure of the gradation correction circuit according to the second embodiment.

In FIG. 4, a gradation correction circuit 200 according to the second embodiment further comprises a video detection control circuit 113. The structure and the operation except the structure and the operation concerning the video detection control circuit 113 are similar to those of the first embodiment.

The video detection control circuit 113 detects the state of the inputted image such as the maximum luminance value and the minimum luminance value and an average luminance level, controls the respective gradients of the broken line and the respective broken line points to be proper values on the basis of the state to the image. The video detection control circuit 113 operates gradation correction characteristics of the broken line such as the respective gradients of the broken line and the respective broken line points in every blanking period of an image, or in every plural blanking periods thereof. Therefore, the setting of the broken line points and gradients can be changed in every V rate or in every plural V rates.

As described above, the gradation correction circuit according to the second embodiment further comprises the video detection control circuit 113 which operates the gradation correction characteristics on the basis of the state of the image in each unit of predetermined blanking periods. Therefore, the correction characteristics of the gradation correction circuit 200 can be given in real time and can be effectively used for an improvement in an image quality.

Embodiment 3

Hereinafter, a γ correction apparatus according to a third embodiment of the present invention will be described with reference to the drawings.

Figure 5:
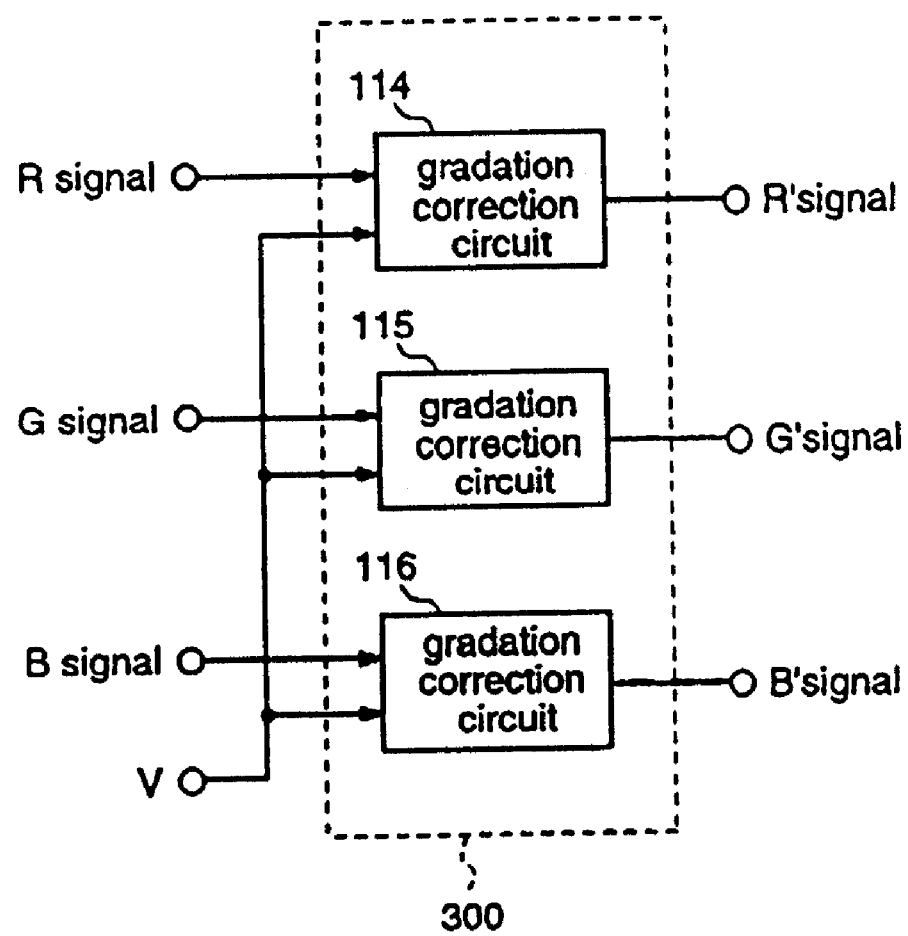
FIG. 5 is a block diagram illustrating a structure of a γ correction apparatus according to a third embodiment of the present invention.
Figure 6A:
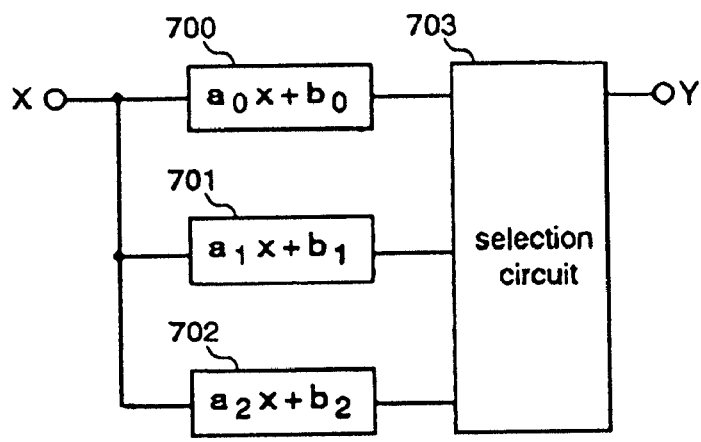
FIG. 6 is a block diagram illustrating a structure of a conventional gradation correction circuit.
Figure 6B:
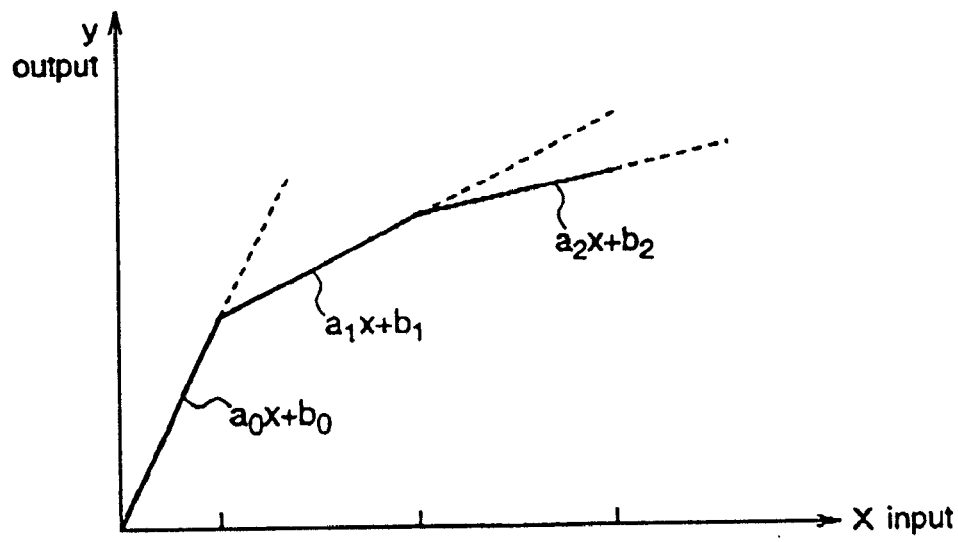

FIG. 5 is a block diagram illustrating a structure of the γ correction apparatus according to the third embodiment.

In FIG. 5, the γ correction apparatus according to the third embodiment comprises a first gradation correction circuit 114, a second gradation correction circuit 115, and a third gradation correction circuit 116. Further, first to third gradation correction circuits 114 to 116 are similar to the gradation correction circuit 100 according to the first embodiment, respectively, and descriptions of the structure and the operation thereof are omitted.

The γ correction apparatus according to the third embodiment regards signals inputted to the gradation correction circuits 114 to 116 as an R signal, a G signal, and a B signal, respectively. The γ correction apparatus can perform gradation correction in accordance with the different correction characteristics for each RGB signal.

Therefore, the γ correction apparatus according to the third embodiment controls the first gradation correction circuit 114 for the R signal, the second gradation correction circuit 115 for the G signal, and the third gradation correction circuit 116 for the B signal separately and gives different correction characteristics to the respective gradation correction circuits, thereby resulting in more effective video correction for the input video signal.

What is claimed is:

1. A gradation correction circuit for a display apparatus, comprising:

arithmetic means for operating output values corresponding to respective broken points of a broken line representing input output characteristics of a display apparatus in a vertical blanking period of an input video signal;

a level detection circuit for identifying a size relation between each broken line point which is an input value corresponding to each broken point, and an input video signal, and operating a difference between the input video signal and each broken line point in a video signal period;

correction means for selecting a gradient of the broken line on the basis of an identification result from the level detection circuit, and for performing gradation correction of the input video signal on the basis of a selected gradient of the broken line, the output value being calculated by the arithmetic means, and the difference being calculated by the level detection circuit.

2. The gradation correction circuit of claim 1, wherein the arithmetic means and the correction means share a at least one circuit.

3. A gradation correction circuit for a display apparatus, comprising;

a first selector for selecting a first gradient among plural gradients of a broken line representing input output characteristics of a display apparatus;

a difference arithmetic unit for calculating a first difference value representing a difference between plural broken line points that are the input values corresponding to broken points of the broken line;

a second selector for selecting a second selected difference value value among first difference values calculated by the difference arithmetic unit;

a level detection circuit for receiving the broken line points and the input video signal as inputs, identifying between which first broken line points the input video signal lies, and calculating a second difference value between the input video signal and one broken line point among said first broken line points;

a third selector for selecting a third selected difference value between the second difference value calculated by the level detection circuit and the second selected difference value selected by the second selector;

a multiplier for multiplying the first gradient of the broken line selected by the first selector and the third selected difference value selected by the third selector to calculate a first output;

an integrator for successively adding the values which are successively outputted from the multiplier to calculate a second output;

a register for holding the second output of the integrator as a held output value corresponding to each broken point;

an adder for adding the held output value from the register and the first output from the multiplier; and a control circuit for controlling the first through third selectors and the register on the basis of the identification result from the level detection circuit and the vertical blanking pulse, wherein, when the start of a vertical blanking period is detected by a vertical blanking pulse, the control circuit outputs a selection signal at a predetermined timing, thereby successively instructing the first and second selectors to select the gradients of the broken line and the second selected difference values, respectively, and instructing the third selector to select the second selected difference value selected by the second selector; and, when the start of the video signal period is detected by the vertical blanking pulse, the control circuit instructs the third selector to select the second difference value calculated by the level detection circuit, and instructs the first selector to select the gradient of the broken line corresponding to an identification result from the level detection circuit as well as instructs the register to output the value corresponding to the identification result, on the basis of the identification result.

4. The gradation correction circuit of any of claim 1 through 3, further comprising:

a video detection control circuit for setting the broken line points and the gradients of the broken line on the basis of the input video signal.

5. A γ correction apparatus comprising three gradation correction circuits of any of claim 1 through 3, wherein a first gradation correction circuit performs gradation correction of an R signal, a second gradation correction circuit performs gradation correction of a G signal, a third gradation correction circuit performs gradation correction of a B signal, and correction characteristics of the first through third gradation correction circuits are set for each RGB signal.

* * * * *